3,260,125
GEAR DRIVE ASSEMBLY
John Dolza, P.O. Box 192, Fenton, Mich.
Filed July 8, 1964, Ser. No. 381,173
7 Claims. (Cl. 74—229)

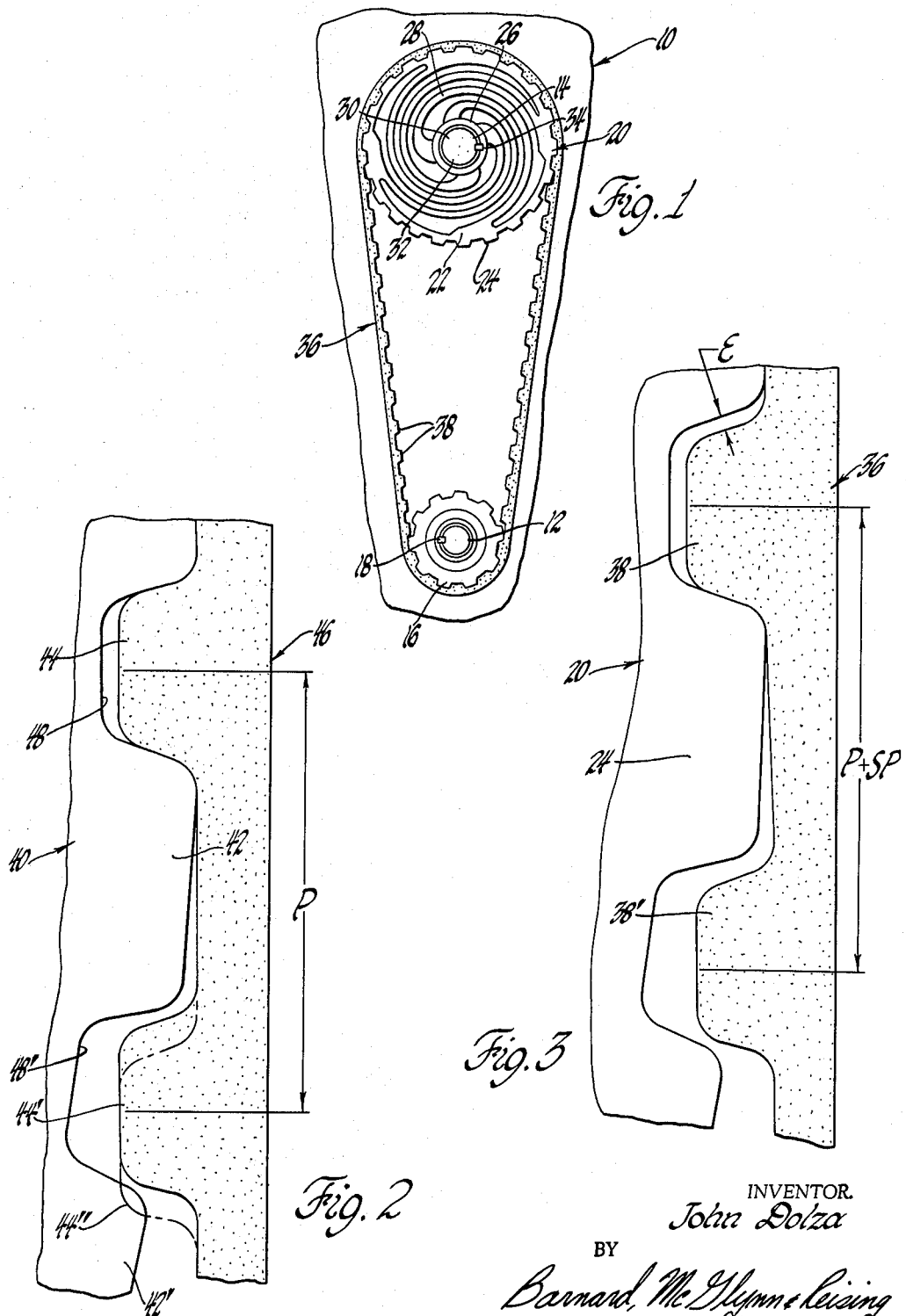

This invention relates to gear drive assemblies and more particularly to a gear tooth construction in which a gear is adapted to be driven by a belt or chain and where it is desirable to place the belt or chain under tension for best operation of the driving and driven members.

In many machines or other mechanically operated devices, it is necessary to drive one or more shafts from a driving shaft located in substantially parallel spaced relation to the shafts to be driven. Typical of such installations is the cam shaft of an internal combustion engine, normally driven through a gear and chain assembly by the engine crankshaft. In such installations a small driving gear is usually attached to the end of the crankshaft extending through the front wall of the engine and a larger gear is mounted on the engine camshaft located in parallel spaced relation to the crankshaft. A belt or timing chain is entrained around the driving and driven gears to drive the camshaft in a particular timed relation relative to the rotation of the crankshaft.

In the copending application Serial No. 338,922, filed January 20, 1964, in the name of John Dolza, and entitled "Tensioning Pulley," there is described a gear and toothed belt construction in which the gear is provided with a resilient means between the gear rim and the gear hub so that the rim may be placed under tension and rotate eccentrically of the hub. This maintains a taut condition in the toothed belt for more efficient operation of the driven system. However, it has been discovered that when the belt is under tension a certain amount of stretch results and under certain circumstances rapid wear of the toothed belt can result from the tension placed on the belt to transmit torque and rotation between pulleys, thus shortening the life and increasing vibration of drive in the assembly.

The construction in which this invention is embodied comprises, generally, a gear tooth configuration which permits optimum entry and exit of the belt tooth and thus avoids any interference between the belt tooth and the gear tooth. In so doing, any rapid wear, vibration, and noise in the assembly are eliminated and a more efficient structure results.

These and other advantages will become more apparent from the following description and drawing in which:

FIGURE 1 is an elevational view of a drive and driven gear assembly wherein the two gears are connected by an elongated toothed belt and wherein the gear teeth are formed in accordance with the invention.

FIGURE 2 is a greatly enlarged view of a portion of a gear and belt assembly similar to that of FIGURE 1 and typical in the prior art.

FIGURE 3 is an enlarged view of a portion of the assembly of FIGURE 1 and similar to FIGURE 2, illustrating a portion of a belt and gear assembly embodying the invention.

Referring more particularly to the drawing, FIGURE 1 best illustrates a gear and belt assembly utilized in a typical installation. The assembly is shown mounted on an engine 10 having a crankshaft 12 and a camshaft 14. Mounted on the crankshaft 12 is a gear 16 secured to the crankshaft 12 by means of a suitable key 18 or other convenient means. Secured to the camshaft 14 is a gear 20, such as the gear described and claimed in the aforementioned copending application. Gear 20 has an outer rim 22 with a plurality of teeth 24 formed thereon, rim 22 being separated from hub 26 by a plurality of spiral fingers or spokes 28 having a certain degree of resilience. The center of rotation of the camshaft is indicated at 30, and the center of rotation of the rim 22 is indicated at 32. It is to be noted that in accordance with the aforementioned copending application the rim 22 rotates eccentrically about the center 30 of the hub 26. Gear 20 is secured to the camshaft in any convenient manner, as by a key or the like 34.

Entrained around the gear 16 and the gear 20 is a toothed belt, indicated generally by the numeral 36, provided with a plurality of teeth 38 along its inner periphery. Belt 36 may be formed of any suitable material capable of driving the upper gear 20 through the rotation of the lower gear 16, and at the same time maintain the desired eccentricity of the gear rim 22 of gear 20.

In the typical gear and toothed belt operation, such as shown in FIGURE 2, the system will be at rest and there will be no tension or tensile force on either the driving reach or the driven reach of the belt. When the assembly is caused to rotate, there will be a tangential force $t$ transmitted through the belt and the tension ($T_2$) on the driving side of the belt will be:

$$T_2 = t \qquad (1)$$

The coasting or slack side of the belt will have no tension:

$$T_1 = 0 \qquad (2)$$

If, however, the belt is pretensioned, such as the belt 36 illustrated in FIGURES 1 and 3, each reach of the belt will have a tension T when the system is at rest and when no torque is being transmitted. When the system is put into operation, work is transmitted to the driven pulley 20 by increasing the tension on the pulling side, assuming this to be the right-hand reach as viewed in FIGURE 1 of the drawing, to a value $T'_2$ and reducing the tension of the slack side to $T'_1$. Under these conditions the following formulae will obtain:

$$T'_2 + T'_1 = 2T \qquad (3)$$
$$T'_2 - T'_1 = \text{the driving force} = t \qquad (4)$$

Assuming a condition in which the pretensioning force T is equal to or greater than one-half the driving force $t$, then the pulling side and the coasting side of the belt will change tension only in an amount equal to one-half $t$. That is, $$T'_2 = T + \frac{t}{2} \qquad (5)$$

$$T'_1 = T - \frac{t}{2} \text{ and} \qquad (6)$$

$$T'_2 - T'_1 = T + \frac{t}{2} - \left(T - \frac{t}{2}\right) = t \qquad (7)$$

By comparing Equations 5 and 2, it is apparent that the pretensioning force T reduces by one-half the maximum stretch fluctuation of the pulling side of the belt.

In a situation where an amount of torsional flexibility is combined with radial flexibility, for example, when the pulley is driving a system with torque fluctuation such as a valve mechanism, the torque fluctuation is considerably attenuated. For this reason, $t$ at a given rotational speed may vary considerably less than if a resilient hub was not used.

Reference is now made to FIGURE 2 showing an enlarged portion of a typical gear and tooth belt assembly at that point where the belt leaves the driven gear. As is illustrated in FIGURE 2, the gear, illustrated generally by the numeral 40, has a series of teeth 42 extending outwardly therefrom and engaging the teeth 44 extending inwardly from the belt, indicated generally by the numeral 46. In a situation where the belt has no pretensioning, the belt 46 assumes the position shown in full lines in FIGURE 2. Under this condition, the tooth 44 is properly received in the gap 48 between the teeth 42 on the gear 40. As the belt 46 leaves the gear 40, the tooth 44' disengages without any interference from tooth 42'.

However, should the belt 46 be pretensioned, a certain degree of stretch will occur so that the leaving tooth 44", shown in dashed and dotted lines in FIGURE 2, interferes with the corner of the tooth 42' on the gear 40 causing the vibration and noise. Continued interference between the tooth 44' and the corner of the tooth 42' will cause rapid wear of the belt teeth and poor operation of the system.

Reference is now made to FIGURE 3 illustrating an enlarged portion of FIGURE 1 where the belt 36 leaves the upper or driven pulley 20. The preceding equations show that if the belt is pretensioned an amount T, then the change of tension on the pulling side is:

$$T_2' - T = \frac{t}{2} \qquad (8)$$

Consequently, the belt at rest has a tension:

$$T = T_2' - \frac{t}{2}$$

The position of the belt tooth 38 will be between positions 44' and 44" of FIGURE 2 and the stretch from rest position is about ½ of that illustrated in FIGURE 2. Furthermore, since the tooth 38' is in the minimum stretch position of the belt, the teeth on the gear 20 are formed to the position shown in FIGURE 3 in which the normal pitch $p$ of the belt is increased by an amount $\Delta p$ equal to the mean stretch of the belt per pitch or approximately equal to the stretch of the belt per pitch corresponding to an amount of $t$ average.

Furthermore, if $n$ is the number of the teeth of the gear or pulley, the increased pitch diameter $d_p$ will be:

$$d_p = \frac{n(p + \Delta p)}{\pi} \qquad (9)$$

As illustrated in FIGURE 3, this greatly reduces the exit interference of the belt tooth 38' with the gear tooth 24.

At the same time, to prevent interference of the entering tooth at the opposite side of the gear 20, it is sufficient to cut the pulley dedendum wider than the belt addendum by an amount E, where $E \geq \Delta p$.

If more than one driven or driving gear is used, the same procedure easily establishes the amount of correction, of the pitch for each of the remaining gears.

The foregoing description has been related to toothed belt and gear arrangements and it is to be understood that the description is equally applicable to a toothed gear and chain arrangement wherein the driving circumstances are similar to the foregoing.

Thus, a means is provided for correcting the pitch and tooth configuration of a toothed gear being driven by a belt or chain wherein the belt or chain may be pretensioned a desired amount for optimum operation of the gear system.

It is apparent that after having had reference to the foregoing description and drawing changes and modifications will become apparent to those skilled in the art. However, it is not desired to limit the invention by the foregoing description and drawing, but by the scope of the appended claims in which:

I claim:

1. In combination, a first gear having circumferentially spaced teeth extending outwardly therefrom, a second gear having circumferentially spaced teeth extending outwardly therefrom, and a tensioned continuous elongated member having spaced driving means thereon engageable with said teeth, on said first and second gears, like points on adjacent teeth on said first gear being spaced a distance equal to the spacing of said driving means on said member plus the mean stretch of said member per said driving means.

2. The combination set forth in claim 1 wherein said tensioned elongated member is a belt having spaced teeth thereon.

3. A gear drive assembly comprising:
   a first gear having a plurality of teeth spaced around the circumference thereof and extending outwardly therefrom;
   a second gear having a plurality of teeth spaced around the circumference thereof and extending outwardly therefrom;
   a tensioned elongate continuous member having spaced means thereon engaging said teeth on said first and second gears;
   like points on adjacent teeth on said first gear being spaced apart a distance equal to the spacing of said driving means on said member when said member is not under tension plus the mean stretch of said member per driving means when said member is tensioned.

4. The assembly set forth in claim 3 wherein said elongated member is a belt and said driving means include a plurality of teeth on said belt.

5. The assembly set forth in claim 4 wherein the space between said teeth on said gear is greater than the width of said teeth on said belt by an amount equal to or greater than the mean stretch of said belt per tooth.

6. A gear drive assembly comprising:
   a driving gear having a plurality of teeth spaced around the circumference thereof;
   a driven gear spaced from said driving gear and having a rim with a plurality of teeth spaced around the circumference thereof and a hub connected to said rim by flexible means to permit eccentric rotation of said rim relative to said hub;
   and a continuous elongated belt entrained around said driving gear and said driven gear and having a plurality of teeth engaging said teeth on said driving gear and said driven gear, said belt being tensioned to maintain said rim of said driven gear in eccentric relation to said hub of said driven gear;
   like points on adjacent teeth on said driving and driven gears being spaced apart a distance equal to the spacing between like points on adjacent teeth on said belt when said belt is untensioned plus the mean stretch of said belt per tooth when said belt is tensioned.

7. The assembly set forth in claim 6 wherein the spaces between said teeth on said driving gear and said driven gear are greater than the width of said teeth on said belt by an amount equal to or greater than the mean stretch of said belt per tooth.

References Cited by the Examiner

UNITED STATES PATENTS

| | | | |
|---|---|---|---|
| 2,934,967 | 5/1960 | Worrall | 74—229 |
| 2,987,932 | 6/1961 | Szonn | 74—229 |
| 3,083,583 | 4/1963 | Szonn | 74—229 |
| 3,117,460 | 1/1964 | Traeger | 74—229 |

FOREIGN PATENTS 963,346  12/1949  France.

DAVID J. WILLIAMOWSKY, *Primary Examiner.*

DON A. WAITE, *Examiner.*

J. A. WONG, *Assistant Examiner.*